United States Patent [19]

Onal

[11] 3,953,150
[45] Apr. 27, 1976

[54] IMPELLER APPARATUS
[75] Inventor: Hasan F. Onal, Denver, Colo.
[73] Assignee: Sundstrand Corporation, Rockford, Ill.
[22] Filed: June 13, 1974
[21] Appl. No.: 479,130

Related U.S. Application Data
[63] Continuation-in-part of Ser. No. 225,096, Feb. 10, 1972, Pat. No. 3,817,653, and a continuation-in-part of Ser. No. 382,374, July 25, 1973.

[52] U.S. Cl............................ 416/184; 416/183; 416/175; 416/199
[51] Int. Cl.² ........................................ F04D 29/26
[58] Field of Search................ 415/74, 143, 213 R, 415/215; 416/177, 179, 183, 184, 185, 186, 175 R, 199 R

[56] References Cited
UNITED STATES PATENTS

| | | | |
|---|---|---|---|
| 272,595 | 2/1883 | Smith.................................. | 415/213 |
| 367,564 | 8/1887 | Wade et al........................... | 415/74 |
| 1,586,978 | 6/1926 | Dorer.................................. | 415/143 |
| 2,165,808 | 7/1939 | Murphy............................... | 416/186 |
| 2,704,516 | 3/1955 | Mock et al.......................... | 415/143 |
| 2,882,829 | 4/1959 | Wade.................................. | 416/186 |
| 3,082,695 | 3/1963 | Buschhorn.......................... | 416/186 |
| 3,163,119 | 12/1964 | Huppert et al..................... | 415/215 |
| 3,221,661 | 12/1965 | Swearingen........................ | 415/143 |
| 3,228,344 | 1/1966 | Cooper............................... | 416/183 |
| 3,442,220 | 6/1969 | Mottram et al.................... | 415/215 |
| 3,644,056 | 2/1972 | Wiselias............................. | 416/176 |

FOREIGN PATENTS OR APPLICATIONS

| | | | |
|---|---|---|---|
| 430,022 | 6/1935 | United Kingdom................ | 416/186 |
| 723,706 | 2/1955 | United Kingdom................ | 416/186 |
| 814,564 | 6/1959 | United Kingdom................ | 416/186 |
| 31,749 | 11/1961 | Finland............................... | 416/186 |
| 601,966 | 12/1925 | France................................ | 416/184 |
| 4,016 | 1884 | United Kingdom................ | 415/143 |

Primary Examiner—Henry F. Raduazo
Attorney, Agent, or Firm—Wegner, Stellman, McCord, Wiles & Wood

[57] ABSTRACT

A high speed, high capacity impeller assembly for a double suction, double volute centrifugal pump. The impeller assembly includes an impeller and two inducers rotatably mounted on a shaft. The inducers feed influent into the eye of the impeller on either side thereof. The impeller includes a plurality of vanes having a low lead angle at the leading edge of each vane. Partial vanes are also provided between each main vane to reduce vortex motion and pump vibration.

9 Claims, 8 Drawing Figures

IMPELLER APPARATUS

This is a continuation-in-part of application Ser. No. 225,096, now U.S. Pat. No. 3,817,653 filed Feb. 10, 1972, and of application Ser. No. 382,374, filed July 25, 1973.

This invention relates to a centrifugal pump and more specifically relates to a double suction impeller arrangement for a centrifugal pump.

Generally speaking, centrifugal pumps are made up of two basic elements; one stationary, the other rotating. The function of the stationary element is to provide a suitable support and enclosure for the rotating element and direct effluent efficiently therefrom. It generally consists of a pump case, packing or stuffing boxes, seals, bearings and one or more volutes. The rotating element generally consists of a shaft on which is mounted a wheel fitted with vanes and known as the impeller. The rotating element converts the mechanical power input of the pump drive to kinetic energy and imparts this energy to the liquid. The kinetic energy is then converted to potential energy or pressure energy in a gradually widening passage or so called volute of the pump case.

The method conventionally used in pumps of this type to produce high heads involves the employment of additional impellers in series. In such a series or multi-state arrangement, the heads produced by each of the impellers acting in series are additive. However, there are several disadvantages associated with multi-stage pumps. Multi-stage pumps require an axially split case. At pressures above 1000 psi it becomes difficult in such a case to prevent leakage and erosion across the face of the axial joint. This is particularly true after a pump has been in service for some time and has been dismantled for maintenance. To combat this, the practice in high pressure multi-stage pumps is to use an outer case or cylindrical case which in effect envelops the axial split case. The employment of the cylindrical case is expensive and adds substantially to the overall weight of the pump. Moreover, a multi-stage pump is very difficult to balance and the weight of the multiple impellers results in a significant deflection of the pump shaft. Shaft deflection and unbalancing create vibrations during the operation of the pump and cause appreciable load to be applied to the pump bearings thereby increasing maintenance requirements and substantially decreasing the useful life of the pump.

The pump of the present invention in order to avoid the problems of multi-staging employs an entirely different method for producing the desired high heads. The method involves an increase in the speed of the rotating element or more specifically an increase in impeller speed to speeds which exceed 20,000 rpm. This method has been employed successfully in low flow centrifugal pumps, but prior to this invention it has been considered impractical for high flow centrifugal pumps.

A major disturbing factor at such high speeds is cavitation. The term cavitation is used loosely to describe the formation and violent collapse of vapor or of vapor and gas bubbles formed within the liquid as a consequence of extreme reductions in the absolute static pressure. In centrifugal pumps this reduction in pressure occurs at the suction side of the impeller and for satisfactory operation of any centrifugal pump operating at a particular speed and capacity there is a minimum pressure requirement at this point generally expressed in terms of net positive suction head (NPSH). Present centrifugal pumps operating at speeds up to 3600 rpm generally operate free of cavitation, however, at higher speeds the required NPSH becomes difficult to maintain. At the speeds suggested for the present pump it was heretofore felt that the problems of cavitation would be extreme, causing destructive pitting and a substantial decrease in the efficiency of the pump.

Another factor which has dictated against the use of a high speed impeller involves the stresses acting on the impeller due to the centrifugal forces which would be generated by such speeds. Similar concern has also been expressed with regard to the stresses acting on the pump case when high heads are to be produced. It has also been anticipated that the heat generated by an impeller operating at speeds up to and exceeding 20,000 rpm would create other problems of considerable magnitude, including the problem of parts freezing or fusing together after a period of operation.

Further problems associated with high speed rotation have also dictated against the use of such speeds in centrifugal pumps. The entrance angles of conventional impellers are such that substantial shock is experienced by the flow passing therethrough. However, it has been felt that the reduction in entrance angle would simply lead to nonproductive rotation similar to the effect of rapidly rotating a disk. Along with the disruption of the flow at its introduction into the impeller, substantial turbulence and vortex action has been found to occur in high speed impellers. These various flow conditions act to substantially reduce the over all efficiency of the impeller.

Therefore, it it a primary object of this invention to provide an impeller assembly for a single stage, high speed centrifugal pump of unique and novel design which will operate efficiently at very high rpm's to produce high flow and high heads. In accordance with this and other objects, the impeller assembly of the present invention briefly comprises the rotating portion of the centrigual pump as herein disclosed. The centrifugal pump includes a rotating portion and a stationary portion, the parts of each being constructed of a material having high strength and corrosion resistant characteristics. The stationary portion which supports and houses the rotating portion, includes a radially split pump case having two similar passages or volutes with their outlets 180° apart. The rotating portion or impeller assembly includes an impeller and two inducers rotatably mounted on a shaft. The impeller is enclosed in shrouds which extend over the separate inducers and is designed for double suction, having inlets on each side thereof. The vanes of the impeller are Francis type vanes having a helical surface and an entrance angle which changes with radii and section. The entrance angle at the leading edge of the vane is quite low and is so configured as to act similar to an inducer at the eye of the impeller. Partial vanes are also provided to reduce turbulence in the impeller. Adjacent each inlet and secured to the shaft is an inducer component having spiral blades which extend radially from the shaft and which feed the influent toward the impeller vanes.

Other and further objects and advantages of this invention will be made readily apparent from the following detailed description and the accompanying drawings.

FIG. 2b is a sectional view and a continuation of the right hand end of FIG. 2 on an enlarged scale illustrating the mounting of the other end of the pump shaft.

Before referring in detail to the drawings, it should be noted that the particular design of any pump is influenced by hydraulic, mechanical and metallurgical considerations. The hydraulic design of the pump concerns the pump head, capacity and speed requirements and the physical characteristics of the liquid being pumped. The mechanical or structural design must satisfy the requirements for both hydraulic and material efficiency. It must meet the restrictions of form and proportions imposed by the characteristics of the materials of construction and at the same time provide for structural strength and stability. The metallurgy is concerned with the temperature and the chemical properties of the liquid as well as the physical properties and corrosion resistance of the materials of construction.

The unique and novel design of the present invention harmonizes these hydraulic, mechanical, metallurgical requirements to provide a highly efficient, high flow, high head, centrifugal pump. It is felt that this pump will be desirable for use in several different operations. However, a primary use contemplated is in waterflood operations for oil fields which requires pressures from 1100 psi to 3500 psi and high flow and generally involves the pumping of a corrosive liquid.

Figure 1:
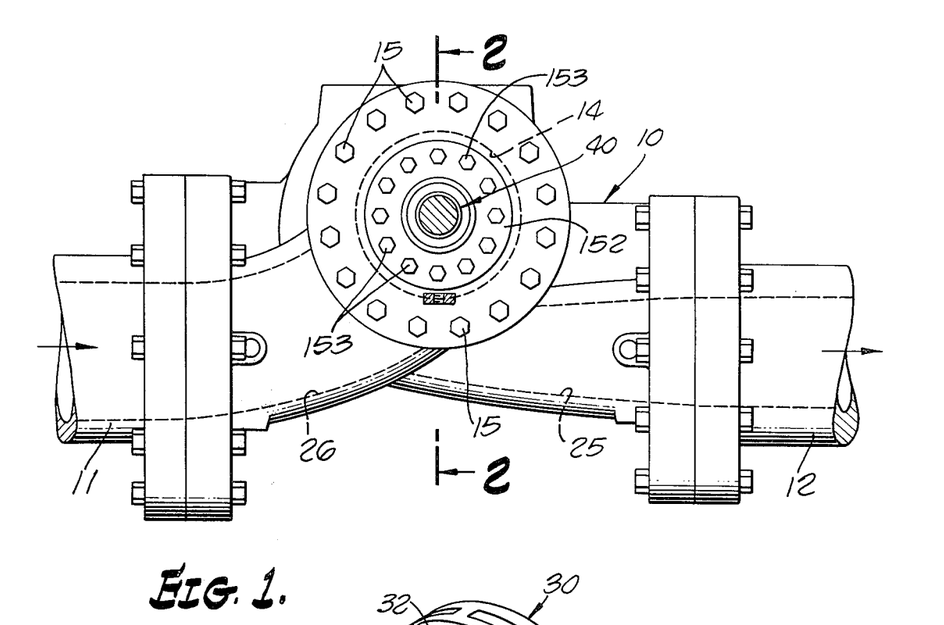
FIG. 1 is a side view of the pump of the present invention illustrating the pump case and its connection with the suction and discharge lines.

Referring now to the drawings and specifically to FIG. 1, the pump case, generally designated 10, is shown connected to an inlet or suction line 11 and to an outlet or discharge line 12. The pump case 10 is constructed of titanium which has a very high strength to weight ratio. Moreover, titanium is substantially corrosion free thereby permitting substantial flexibility with regard to the liquids which can be pumped. It has been found that the pump case 10 will substantially avoid any corrosion during the pumping of salt water for temperatures up to 400° F. However, it should be noted that in most instances, as for example in the case of a multi-stage pump, the cost of titanium would be prohibitive. The compactness of the pump of the present invention makes the use of titanium economical.

Figures 2, 4:
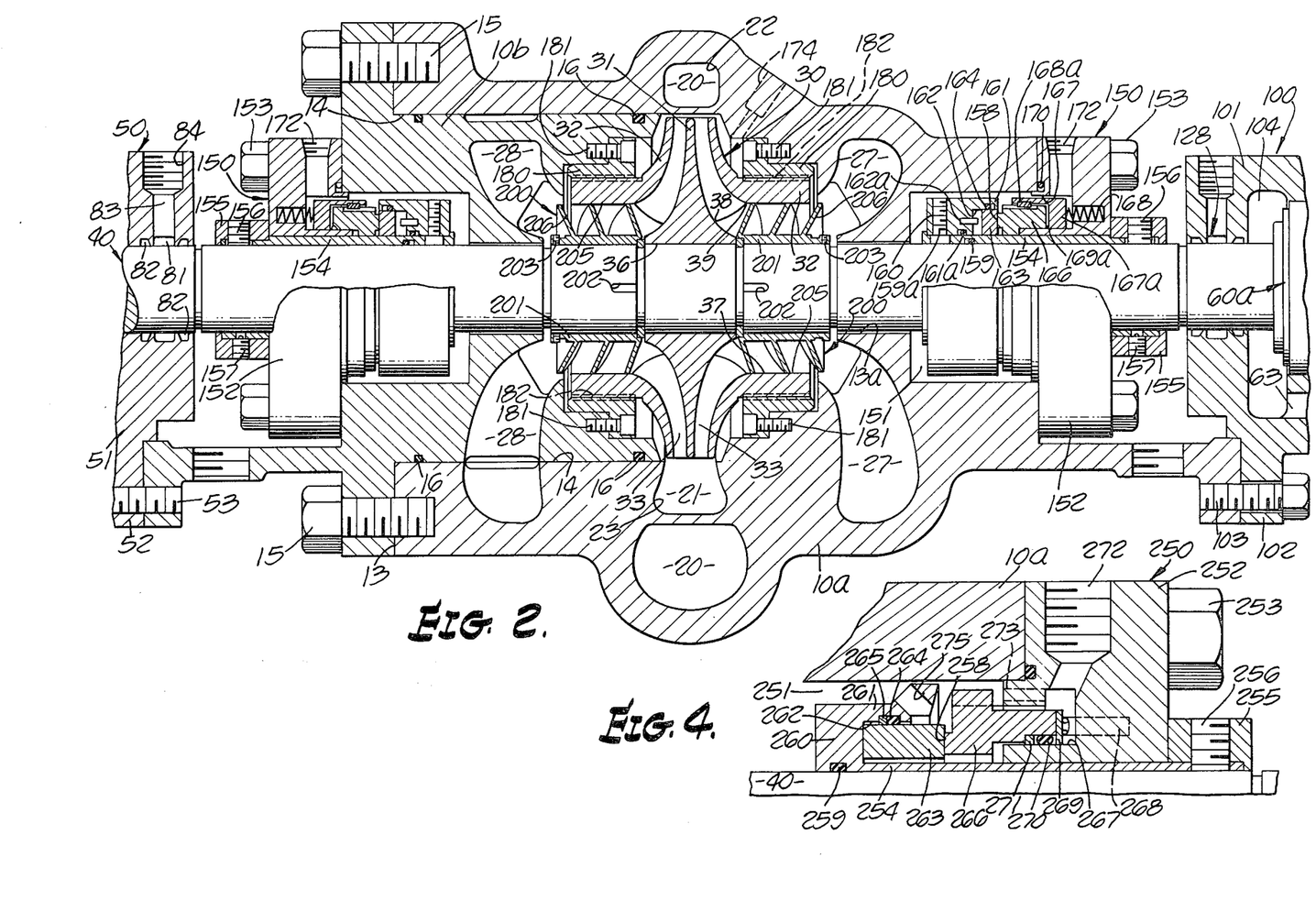
FIG. 2 is a side sectional view taken substantially along the lines 2—2 of FIG. 1 and illustrates the positioning of the pump shaft and impeller within the pump case.
FIG. 4 is a fragmentary side view in section illustrating a modified form of a mechanical seal for use in the pump of the present invention.

The pump case 10 is radially split at 13 as seen in FIG. 2. That is, the pump case 10 is actually comprised of two castings, a body member 10a and an insert member 10b. One side of the casting 10a is provided with an axially extending bore 13a having an enlarged portion 14 in order to receive the rotating element of the pump. The other casting 10b extends into the bore 14 and encloses the open end of the bore with the rotating element stationed between the insert member 10b and the end of the enlarged portion of the bore. The castings 10a and 10b are connected along the split 13 by means 15 and are provided with appropriate sealing means at 16 to prevent leakage therebetween. A radially split pump case is generally preferred over an axially split case such as those used in multi-stage pumps wherein the pump case is split in half along a horizontal center line and the top half is removed to receive the rotating element because at high pressures it is difficult to prevent leakage at the axial joint. This is particularly true after several instances of maintenance to the pump.

The pump case 10 of the present invention is generally referred to as a double volute type pump case. In a double volute type case there are two similar, gradually widening flow channels or passages 20 and 21, as shown in FIG. 2, with openings 22 and 23, respectively, to receive the discharge from the impeller positioned 180° apart. These flow channels create opposing pressures of nearly equal magnitude about the periphery of the impeller and result in an appreciable reduction in the unbalanced radial loads on the shaft and bearings. The volutes 20 and 21 discharge into a discharge passage, shown by the phantom lines 25 in FIG. 1, which is adapted to communicate with the discharge line 12. The pump case is also provided with an inlet passage, as shown in FIG. 1 by the phantom lines 26, adapted to communicate with the suction line 11. The inlet passage is split into two channels (not shown) which divide and direct the incoming flow into two inlet passages 27 and 28 on each side of the impeller, generally designated 30. When the incoming flow is divided in this manner the pump is typically referred to as a double suction type pump. The symmetrical aspects of double suction provide for overall pump balance which avoids the necessity for a balance line normally required in other type pumps.

Figure 3:
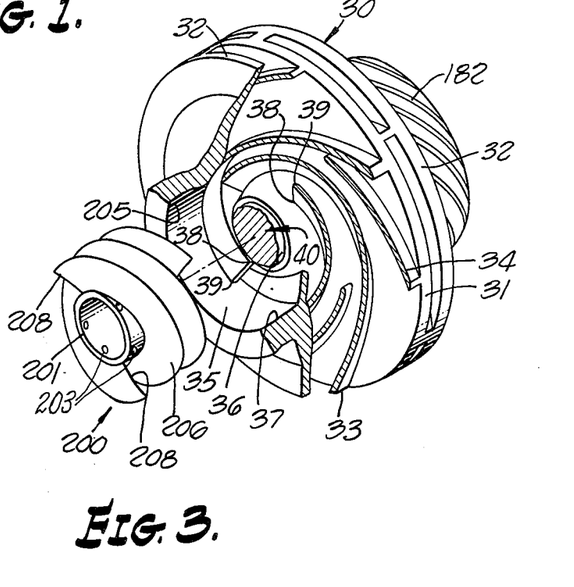
FIG. 3 is a perspective view partially broken away and exploded of the impeller and inducer component and illustrating the impeller vanes and the inducer blades and their respective relationship.

The impeller assembly, which is the means employed to move the mass of liquid through the pump and to generate the delivery head, includes a double suction impeller 30 and two inducers, described hereinafter and generally designated 200. The impeller 30 and inducers 200 are rotatably mounted in the pump case on the pump shaft 40. The impeller 30 is a single casting of titanium and includes a central hub 31, two shrouds 32, primary vanes 33, and partial vanes 34. The shrouds 32 extend axially away from the central hub 31 to form two inlet eyes 35 which surround the separate inducers 200. The influent to this impeller assembly passes axially inward through each inlet eye where it is drawn by the inducers toward the impeller. The influent is then directed radially outward on either side of the central hub 31 under the influence of the primary and partial vanes 33 and 34.

Turning in greater detail to the various components of the impeller, it is here noted that the impeller as described is designed for specific performance characteristics. However, variations on this specific design are possible without departing from the present invention as a means for altering the performance of the system for specific output requirements. In some instances, a greater head with less flow is of interest and in other instances the reverse is required. Further, the overall size of the impeller assembly may vary to accommodate different power inputs. The impeller is cast of titanium by means of an investment casting process. Conventional, enclosed impellers presently used are generally unsuitable for high speed use as contemplated by the present invention due to their weight and the resulting centrifugal forces which would be created. However, because the impeller 30 of the present invention is of titanium, it is relatively light and yet exceptionally strong to withstand the high centrifugal forces created. The impeller is also able to attain high speed use because of the balanced nature of the pump. The impeller 30 is a double suction impeller in order that the pressures on either side of the impeller will be equalized. The vanes, as hereinafter described, are staggered to prevent vibration due to the reaction impulse caused by the release of liquid from the vanes into the volutes as the vanes pass thereby. Thus, the overall construction and balanced design of the impeller of the present invention enables it to be used at speeds in excess of 20,000 rpm.

Figure 5:
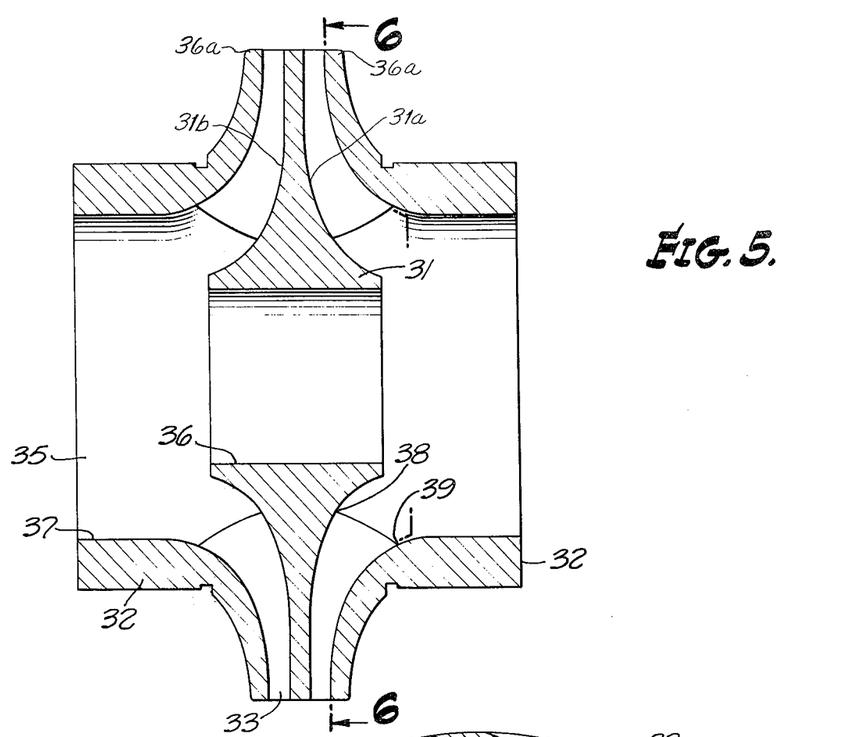
FIG. 5 is a cross-sectional side view of the impeller taken along a center line.
Figure 6:
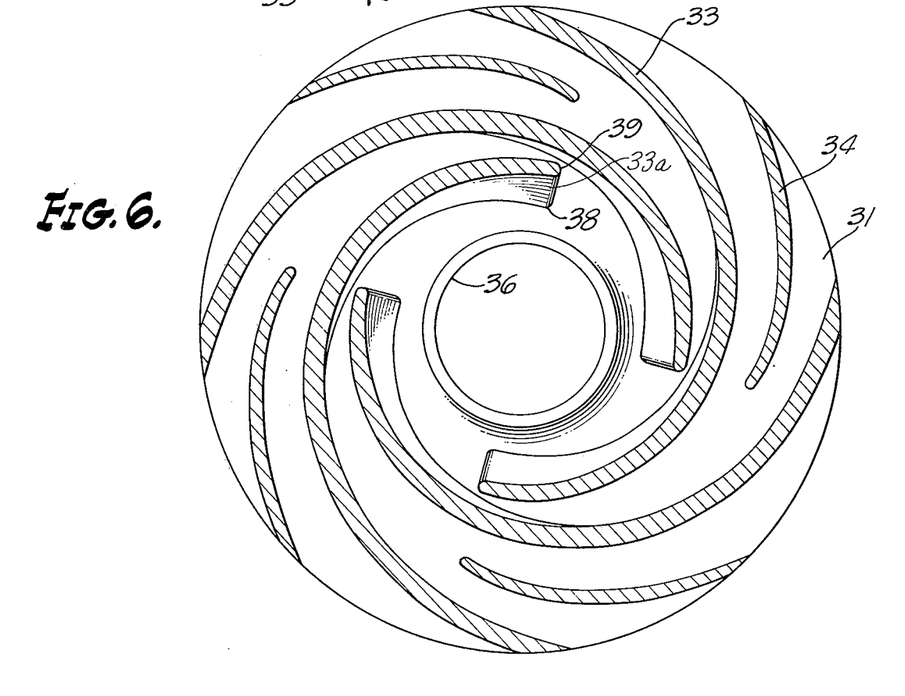
FIG. 6 is a cross-sectional elevation of the impeller taken along line 6—6 of FIG. 5.

The central hub 31 of the impeller 30 includes a bore 36 extending therethrough for receipt of the pump shaft 40. The central hub 31 is symmetrical about this central bore 36 and is defined by two exterior surfaces 31a, 31b which form concave surfaces of revolution about the axis of the bore 36 which curve from outside peripheral edges 36a first radially inwardly and then axially outwardly to a position adjacent the edge of the bore 36. The central hub 31, in the present embodiment, has an overall diameter of 6½ inches. The bore diameter is 1¾ inches. The width of the hub measured along the axial direction at its outer edge is 3/16 of an inch and is 1¾ inches at the bore 36. The central hub 31 is best seen in FIG. 5.

The shrods 32, cast integrally with the entire impeller 30, extend on either side of the central hub radially outward to a position adjacent the outer edge of the central hub 31 and spaced therefrom. The spacing between the central hub 31 and each shroud 32 at the outer edge of the impeller in an axial direction is 7/32 of an inch. The shroud thickness at this outer edge of the impeller is approximately 3/16 of an inch. Each shroud 32 extends inwardly and then axially away from the central hub 31 to a position 2 ¼ inches from the center of the impeller. A bore 37 having a 3 ¼ inch diameter is provided in the axial extension of each shroud 32 for receipt of the inducer. Thus, the impeller shrouds 32 cover both the inducers 200 and the main body of the impeller. This reduces losses from fluid leakage from the discharge side of the impeller back to the suction side. As a result, better pump efficiency is obtained.

Located on each side of the central hub 31 are the primary vanes 33. There are four such primary vanes 33 on each side of the impeller. Each vane 33 has a lead angle (inclination relative to a tangent of a rotating point on the impeller) of 7 ½ degrees and is 1/16 of an inch thick at the leading edge of the vane adjacent the central hub 31. This point is designated as 38. Point 38 is also 1 ⅝ inches from the axial centerline of the impeller. Adjacent theh shroud 32 at point 39, the lead angle is 6°and the distance from the axial centerline of the impeller is 1 45/64 inches. Thus, the leading edge 33a of each primary vane 33 has a very low entrance angle and is at a greater distance from the axial centerline of the impeller at the shroud than at the central hub 31. The thickness of each primary vane 33 gradually increases from 1/16 of an inch at its leading edge to ⅛ inch as it spirals outwardly to the outer edge of the impeller. At the outer edge of the impeller, the lead angle of each primary vane 33 is 16°. The vanes 33 are also twisted so that the leading and trailing surfaces thereof are parallel to the axial centerline of the impeller at this outer position. From the leading edge of each primary vane 33 to the trailing edge thereof, the total angular displacement about the axial centerline of the impeller is 195°. Thus, the primary vanes 33 employ extremely low entrance angles about a substantial spiral. Further, the blades are cocked (inclined axially) at the inlet eye portion of the impeller. These features help draw the influent axially and then radially through the impeller at a very high impeller speed.

The low entrance angles operate to improve flow by reducing the shock effect associated with higher, conventional entrance angles. Further, the effects of cavitation are reduced because the collapsing flow does not move directly at the vanes; but rather, the cavitation force is directed along each primary vane 33. This configuration including the low entrance angles allows the point 39 to operate at speeds far in excess of 110 feet per second. In the present embodiment as herein described, point 39 is driven at a speed of 260 feet per second. One hundred and ten feet per second has been the established standard maximum speed for the top of the leading edge of an impeller vane for aqueous liquids. Any greater vane speed was felt to be nonproductive because of cavitation and other factors. The entrance angles for pumps were considered to have a minimum productive angle at the leading edge of a vane which was 14°. In isolated instances on small impellers, an entrance angle of as little as 13°. has been employed. It was believed that lower entrance angles would result in the impeller nonproductively rotating similar to a rapidly rotating disk. Consequently, in violating two established principles, the present, highly productive impeller has been devised.

Between each of the primary vanes 33 there is located a partial vane 34. Each partial vane 34 extends from a position midway between the adjacent primary vanes 33 at a point 180°behind the leading edge of the immediately preceeding primary vane 33 to a position at the outer rim which is 41°behind the immediately preceeding primary vane 33. The partial vane 34 varies from 1/16 of an inch in thickness from its leading edge to ⅛ of an inch at its outer edge. The partial vanes enhance the overall efficiency of the impeller by reducing vortex currents and the like which are developed by the extremely high rotational speeds of the impeller. The partial vanes 34 also increase the number of impulses caused by the release of liquid from the vanes into the volutes. As the number of impulses are increased, the magnitude of each impulse is reduced. This spreading of the impulse forces reduces the problem of vibration which is caused by this repeated reaction impulse. At the same time, the partial vanes 34 do not reduce the critical inlet area of the impeller. If the partial vanes 34 were to continue to the inner eye of the impeller, they would reduce the minimum inlet area by the total cross-sectional area of the vanes. This would result in a substantially reduced capacity of the system.

The overall arrangement of the various components of the impeller must also be considered in their total operative relationship. The minimum entrance area in the present embodiment between impeller blades is 0.316 square inches. This is a cross-sectional area between two succeeding impeller blades and between the central hub 31 and the shrouds 32. Thus, the total minimum entrance area for the double suction impeller is 2.53 square inches. This area provides an optimum between an area which is too small and would result in the starving of the impeller and an area which is too large and would dicate a vane configuration that would cause undue shock in the flow. The impeller vanes 33 and 34 located on one side of the impeller 30 are staggered with respect to the vanes on the other side of the impeller in order that the impulse reaction force brought about by release of liquid as the vanes pass the volutes is not combined between opposed vanes. Thus, vibration is kept to a minimum.

The functional result of this specific impeller configuration along with the inducer arrangement provide exceptional performance for a single stage centrifugal pump. Specifically, using a 1,570 brake horsepower prime mover and rotating the impeller at 17,500 rpm, the maximum flow from the pump is 915 gallons per minute. At this flow rate a dynamic pressure head exists which is approximately 2,000 psi. With the impeller running at 17,500 rpm and the distance from the axial centerline to the point 39 being 3.406 inches, the vane speed at point 39 is 260 feet per second, well above the standard 110 feet per second. Again, variations may be made in the overall configuration of the impeller assembly to achieve higher pressures or higher flows as required by the specific application.

Figure 2A:
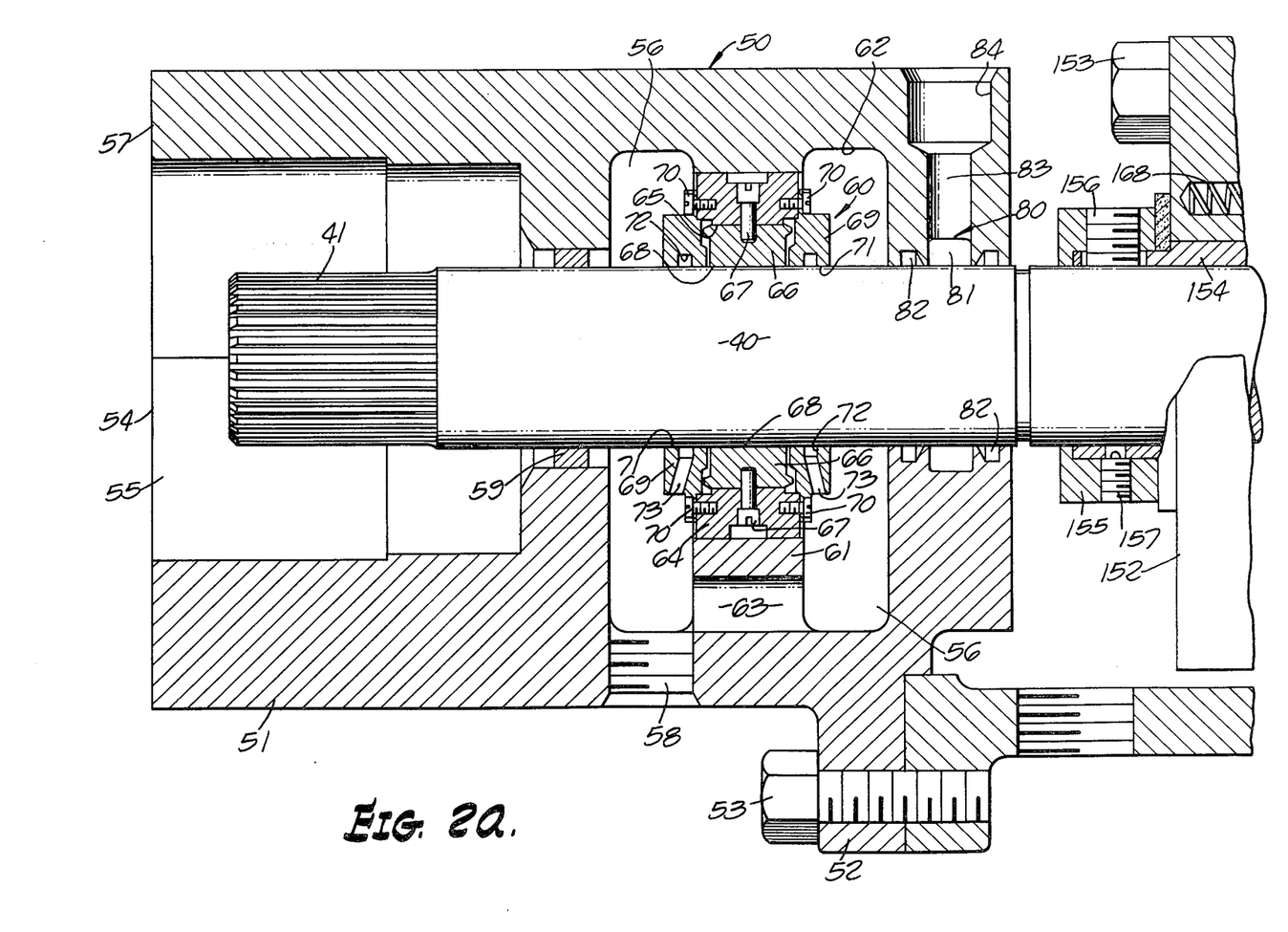
FIG. 2a is a side sectional view and a continuation of the left hand end of FIG. 2 on an enlarged scale illustrating the mounting of the driven end of the pump shaft.

Referring now in detail to the specific components of the pump and beginning with FIG. 2a, it is noted that the driven end of the pump shaft 40 is provided with a coupling, such as a spline coupling 41. The drive means (not shown) is preferably a high speed, high horsepower gas turbine, but the present invention is not intended to be limited to any particular type of driver means. Connection between the turbine and the pump shaft 40 through the coupling 41 is intended to be direct. That is, a gearbox such as those generally required between the driver means and a high capacity multi-stage centrifugal pump is not required and therefore is preferably eliminated.

The driven end of the pump shaft is supported by a radial bearing assembly, generally designated 50. The bearing assembly includes a housing 51 which is axially split for inspection purposes when the upper half is removed and which is secured to the pump case at the flange 52 by means such as a bolt connection 53. The housing 51 is preferably formed of ductile iron because of its corrosion resistant characteristics and because of its relatively high strength characteristics which are necessary because of the temperatures generated during high speed operation. An open end 54 of the housing 51 is sealably connected at 57 to the driver means or other means. The housing 51 defines therein an interior coupling chamber 55 and a bearing chamber 56, each of which is filled with lubricant such as oil under pressure from an oil pressure system (not shown). Preferably, when a high speed turbine is employed as the driver, the oil pressure system of the turbine is employed for the pump bearings and coupling. Heretofore, multi-stage centrifugal pumps were unable to utilize the turbine oil pressure system because the gearbox required the excess oil from the oil pressure system. Thus, a separate oil pressure system was required for the pump coupling and bearings and such a separate system added to the expense of the pump.

Oil in the coupling chamber 55 communicates directly through the open end 54 to an oil reservoir of the oil pressure system and oil in the bearing chamber 56 communicates by means of a flexible hose or other similar conduit means through a drain opening 58. A bronze ring 59 provides an annular seal about the pump shaft 40 and prevents communication of oil between the two chambers 55 and 56.

The bearing arrangement on which the driven end of the pump shaft is mounted is a self-aligning tilted pad journal bearing which is adapted to withstand a radial load of 350 lbs. under full speed conditions, 18,000 – 22,000 rpm. The bearing, generally designated 60, is secured to an annular flange 61 which extends inwardly from the sidewall 62 of the bearing chamber 56 at approximately the center thereof and is provided with a passage 63 for communication of oil to both sides of the bearing 60. The bearing 60 includes a cylindrical outer shell 64 locked to the integral flange 61 of the housing by means (not shown) such as a bolt connection. Secured to the inner wall 65 of the shell 64 is a plurality of five circumferentially spaced pads 66 by pins 67 or other similar means, which permit a limited amount of pivotal movement of the pads circumferentially about the shaft 40. In this manner the pads tend to be self-aligning during operation of the pump. The shell 64 and the pads 66 are preferably bronze while each pad 66 is provided on its inner face 68 with a Babbit lining which guards against deformation under high speed and high temperature conditions. During operation of the pump, the pump shaft 40 is not in contact with the Babbit lined surface 68 of the pads, but instead runs on an oil film provided in the space between the pads 66 and the shaft 40. Preferably, the space between the pump shaft 40 and the pads 66 is about 0.0017 inch; this space being sufficiently small to avoid vibrations.

A pair of cylindrical side plates or cover plates 69 secured to each side of the shell 64 at 70 include a central bore 71 through which the pump shaft 40 extends and an annular groove 72 in the bore wall which is in communication with a drain opening 73. The cover plates 69 protect the bearing pads 66 from foreign particulate matter by collecting such matter in the grooves 72 with the matter thereafter being discharged through the drain 73.

To further protect the bearing 60 the bearing assembly 50 is provided with an air seal 80 which includes an annular channel 81 with a pair of annular grooves 82 which flank the larger channel 81 on each side thereof. The channel 81 and the grooves 82 extend circumferentially about the pump shaft 40. During operation of the pump air under pressure is supplied to the channel 81 through a passage 83 which is in communication with an air hose (not shown) connected to the bearing assembly at 84. The grooves 82 form pockets for building air pressure as the air is received from the channel 81. Thus, a seal is provided about the shaft which prevents oil from escaping the chamber 56 and prevents foreign matter from entering the chamber 56.

A second bearing assembly, generally designated 100, for carrying the free end of the pump shaft 40 is seen best in FIG. 2b. The assembly 100 includes a housing 101 which is secured to the pump casing 10 at the flange 102 by a bolt connection 103. The case is preferably ductile iron because of its corrosive resistance characteristics and its relatively high strength at high temperatures. The housing 101 defines an interior axial bearing chamber 104 and a thrust bearing chamber 105, both of which are filled with oil from the oil pressure system (not shown). Communication with the reservoir of the oil pressure system is provided for the chamber 104 through the drain opening 106 and for the chamber 105 through the drain opening 107. The axial bearing, generally designated 60a, of the bearing assembly 100 is also a self-aligning tilted pad journal bearing and is substantially identical to the bearing 60. Therefore, a detailed description of the components of this axial bearing is felt to be merely repetitious and instead the same reference numerals used in the description of bearing 60 are used to identify the identical components of bearing 60a.

The thrust bearing, generally designated 110, is typically referred to as a self-leveling thrust bearing and is adapted to accommodate a limited amount of axial movement by the pump shaft 40 and a thrust load of about 2500 lbs. actual axial thrust. The thrust bearing, generally designated 110, includes a thrust disc 111 secured to the pump shaft 40 by means of a collar 112 which is provided with a keyway 113. A cap 114 threadably secured at 115 to the end of the pump shaft abuts the thrust disc 111 and maintains it in the proper axial position on the pump shaft. The cap 114 is fixed to the pump shaft by a lock screw 116 which prevents relative turning movement therebetween. An adjusting ring 117a on the other side of the thrust disc 111 adjusts the axial position of the pump shaft 40 to properly position the impeller with the volutes as will become evident from the following discussion.

Mounted on each side of the thrust disc 11 are a plurality of six shoes 117, each of which includes a button press fitted thereon. The buttons provide a convex surface 119 which rides on a plurality of rectangular leveling pads 120. The pads 120 are secured by means 121 for limited movement within an annular channel 122 of a pad support disc 123. The pad support discs on each side of the thrust disc are affixed to the housing 101 by means (not shown) such as a bolt or screw.

Circular passages 124 provide for communication of the oil in the chamber 105 around both sides of the bearing 110. A bronze ring 125 locked to the housing 101 by lock screw 126 provides an annular seal about the shaft 40 and prevents communication of oil between chambers 104 and 105. An end plate 127 enclosing the rear end of the chamber 105 is removably connected to the housing 101 by bolts 126 and permits inspection and maintenance of the assembly 100.

The bearing assembly 100 is also provided with an air seal, generally designated 128, which is substantially identical to the seal 80 of the bearing assembly 50. The air seal 128 prevents a loss of oil from the chamber 104 and the introduction of foreign particulate matter into the bearing chambers.

Referring now to the components of the pump contained within the pump case 10, as best seen in FIG. 2, it is noted that at each end of the pump case about the pump shaft 40 there is provided a mechanical seal or so called stuffing box, generally designated 150. The stuffing boxes at each end are identical and therefore a description of only one will be set forth in detail. The stuffing box 150 is contained within an end chamber 151 of the pump case and enclosed by an end plate 152 secured to the pump case by bolts 153. The stuffing box is provided with a sleeve 154 which is concentric about the shaft 40 and extends beyond the end plate 152 to be received by an end cap 155. The end cap 155 is locked to the pump shaft by screws 156 and thereby locks the sleeve 154 to the shaft 40 by the lock screw 157 which secures the sleeve to the end cap. The mechanical seal prevents leakage of fluid from the suction side of the pump and dissipates the heat generated at the contacting surfaces of the rotating components and the stationary components. The sleeve 154 is provided with an O-ring or rubber gasket 159 which prevents leakage between the sleeve and the shaft 40. Secured to the end of the sleeve 154 by bolt means 159a is an end wall 160 having an axially extending cylindrical flange 161 projecting therefrom. An O-ring 161a prevents leakage between the end wall and the exterior surface of the sleeve 154. The cylindrical flange 161 forms an annular channel 162 between the flange 161 and the exterior sidewall of the sleeve 154. Retained within the channel 162 by lock means 162a is a cylindrical insert 163 of tungsten carbide. Positioned between the flange 161 and the insert 163 is a gasket 164.

Biased against the end surface of the insert 163 at 158 is a carbon seal ring or mating ring 166. During operation of the pump the insert 163 rotates with the pump shaft 40 whereas the seal ring 166 remains stationary with the pump case and the surface of contact therebetween at 158 forms the mechanical seal. The seal ring 166 is carried within an annular groove or channel 167 and the end wall 152. A spacer ring 167a locked to the mating ring 166 by means 168a with a gasket member 169a therebetween is positioned between the mating ring 166 and spring means 168. The spring means 168 is retained within the end wall 152 and acts on the spacer ring 167a and thus the mating ring 166 to maintain a proper load at the seal face 158. An O-ring 170 prevents leakage between the end wall 152 and the pump casing.

Coolant is supplied to the stuffing box or seal through an inlet at 172 which communicates with the annular groove 167 for supply of coolant to the contacting surfaces at 158. Preferably, the coolant for the mechanical seal is obtained from the discharge side of the pump through the tap inlet as indicated by the phantom lines 174. Coolant is communicated from the tap 174 to the inlet 172 by a conduit (not shown), such as a flexible hose. By using the pump discharge as the supply for the coolant, the coolant is maintained at the coolant inlet 172 at a higher pressure, approximately 15 psi, than at the suction side of the pump to thereby promote any fluid flow, which might occur due to leakage, back to the suction side of the pump.

Directing attention now to the impeller and its mounting with respect to the pump case, it should be noted that the impeller is mounted on the shaft 40 by means of a spline coupling (not shown) which reduces torsional vibrations. The centering or positioning of the impeller 30 with respect to the jump case is determined by the adjusting ring 117a as described earlier. When properly positioned, as shown in FIG. 2, the impeller 30 rides during operation on a pair of wearing rings 180 bolted to the pump case at 181 and interposed between the pump case and the exterior surface of the shroud of the impeller. The wearing rings 180 minimize leakage from the discharge side of the impeller back to the suction side or inlet side at 28 and 27. Both the exterior surface of the cylindrical flange 40a of the impeller shroud and the surface of the wearing ring in contact therewith are provided with oppositely oriented spiral grooves 182. That is, the wearing rings are provided with left hand spiral grooves and the exterior surfaces of the shrouds are provided with right hand spiral grooves or vice versa. These spiral grooves prevent a freezing of parts at the contacting surfaces during a shutdown of the pump.

Attention is now directed to a component which has a marked effect on the total operation of this high speed, high flow centrifugal pump. The inducer component, generally designated 200, is provided on each side of the impeller at the eye of the impeller or the inlet just preceding the vanes. Each inducer 200 includes a cylindrical section 201 which is positioned concentrically about the pump shaft 40 and locked thereto by a keyway 202 and lock screws 203. Projecting from the cylindrical section 201 and substantially to the inner surface of the cylindrical flange 40a of the shroud at 205 are four axially spaced spiral blades 206 which wind about the cylindrical section 201 in the same direction as the vanes 32. The leading edges 208 of the blades 207 and 206 are approximately 90 apart and each leading edge has a cutting angle with respect to the incoming fluid of about 7½°. Moreover, the pitch of the blades is such that the liquid is caused to be accelerated thereby in a direction toward the vanes and in a direction correspondingly tangent with the direction of the vanes substantially at the impeller eye and in the direction of rotation of the impeller. Thus, the blades 206 are adapted to maintain a positive pressure by the fluid on the backside of the vanes 32 and 33 during high speed operation of the pump and thus substantially reduce the problem of cavitation.

FIG. 4 illustrates another form of mechanical seal or stuffing box for use in the present invention. The stuffing box shown in FIG. 4 and generally designated 250 is contained within an end chamber 251 of the pump case and enclosed by an end plate 252 secured to the pump case by bolts 253. The stuffing box is provided with a sleeve 254 which is concentric about the shaft 40 and extends beyond the end plate 252 to be received by an end cap 255. The end cap 254 is locked to the pump shaft by screws 256 and thereby locks the sleeve 254 to the shaft 40 by the lock screw 257 which secures the sleeve to the end cap. The sleeve 254 is provided with an O-ring or rubber gasket 259 which prevents leakage between the sleeve and the shaft 40. Extending radially from the end of the sleeve is an end wall 260 having an axially extending cylindrical flange 261 projecting therefrom and forming an annular channel 262 between the flange 261 and the exterior sidewall of the sleeve 254. Retained within the channel 262 is a cylindrical insert 263 of tungsten carbide. Positioned between the flange 261 and the insert 263 is a Teflon ring 264 and a gasket 265. Locking means (not shown) maintain the insert within the channel 262.

Biased against the end surface of the insert 263 at 258 is a carbon seal ring or mating ring 266. During operation of the pump the insert 263 rotates with the pump shaft 40 whereas the seal ring 266 remains stationary with the pump case and the surface of contact therebetween at 258 forms the mechanical seal. The seal ring 266 is carried within an annular groove or channel 267 in the end wall 252. Spring means 268 retained within the end wall 252 acts on one end of the seal ring 256 to maintain a proper load at the seal face 258. A disc 269 is interposed between the seal ring 266 and the spring 268 and an O-ring 270 and Teflon ring 271 are inserted between the seal ring 266 and the inner wall of the annular groove 267.

Coolant is supplied to the stuffing box or seal through an inlet at 272 which communicates with the annular groove 267 and a plurality of passages 273 which supply coolant to the contacting surfaces at 258. A passage 275 extends through the flange member 261 to the area of contact between the insert 263 and the seal ring 266 to permit the removal of hot fluid caused by the heat generated due to friction at the contacting surfaces 258.

The present invention provides a relatively compact and economical pump particularly suitable for high head, high capacity applications. In many instances it can be used where it was heretofore thought necessary to employ a less efficient, less economical multi-stage centrifugal pump.

Having fully described my invention, it is to be understood that I do not wish to be limited to the details herein set forth, but my invention is of the full scope of the appended claims.

What is claimed is:

1. An impeller assembly for a centrifugal pump comprising
   a hub;
   a plurality of radially outwardly spiralling vanes fixed to said hub, a shroud fixed to said vanes and said vanes having a lead angle at the leading edge of each said vane of less than thirteen degrees (13°) and which increases from said shroud to said hub, curved partial vanes positioned between said spiral vanes, said partial vanes extending to positions at the outer edge of said hub and having leading edges positioned approximately 180° angularly behind the leading edge of a preceding spiral vane and at radial distances from the axial centerline of said hub greater than the radial distances from the axial centerline to the leading edges of said spiral vanes.

2. An impeller assembly for a centrifugal pump comprising
   a central hub;
   primary vanes fixed to said hub with leading edges and spiralling outwardly to an outer periphery of the hub;
   partial vanes positioned between said vanes, said partial vanes extending to positions at the outer edge of said hub from positions on said hub at radial distances from the axial centerline of said hub greater than the radial distances from the axial centerline to the leading edges of said primary vanes and trailing the leading edge of the preceding primary vane by more than 90° angularly whereby only the primary vanes act in an inlet area of the assembly.

3. The impeller assembly of claim 2 wherein said primary vanes have a lead angle at the leading edge of each said vane of less than thirteen degrees (13°).

4. The impeller assmbly of claim 2 further comprising shrouds fixed to said vanes and said partial vanes on either side of said hub.

5. The impeller assembly of claim 2 wherein the leading edges of said partial vanes are positioned at a radial distance from the axial centerline of said hub, said distance being around midway between the distances from the axial centerline to the leading edges of said vanes and from the axial centerline to the trailing edges of said vanes.

6. An impeller assembly for a double suction, double volute centrifugal pump comprising
   a central hub;

primary vanes integrally formed on either side of said central hub and spiralling outwardly to have trailing edges at the periphery of the assembly;

shrouds fixed to said vanes on either side of said central hub;

curved partial vanes positioned between said vanes;

the lead angle at the leading edge of each said primary vane being around six degrees (6°) at said shroud and varying continuously to around seven and one half degrees (7½°) at said central hub;

said partial vanes having a leading edge trailing the leading edge of a preceding primary vane by at least 90° to not be in the inlet area defined by the leading edges of the primary vanes.

7. The impeller assembly of claim 6 further comprising inducers positioned within said shrouds adjacent the leading edges of said primary vanes, said inducers each including four spiral blades each having a lead angle of around seven and one half degrees.

8. An impeller assembly for a double suction, double volute centrifugal pump, comprising:

a central hub;

a plurality of primary vanes integrally formed on both sides of said central hub and spirally extending outwardly of the hub with increasing space therebetween and with an angular extent of approximately 195° about the axis of the impeller and with the primary vanes on one side of the central hub being staggered relative to the primary vanes on the other side;

a pair of shrouds fixed to said vanes, one at each side of said central hub;

the lead angle at the leading edge of each of said primary vanes being around 6° at said shroud and varying continuously to around 7½° at said central hub;

a plurality of curved partial vanes positioned one between a pair of primary vanes, each of said partial vanes having a leading edge positioned approximately 180° angularly behind the leading edge of the preceding primary vane and at a radial distance from the impeller axis which is approximately midway between the leading edges of the primary vanes and the periphery of the impeller, and said partial vanes having a trailing edge at the periphery of the impeller approximately midway between the trailing edges of the adjacent primary vanes whereby said partial vanes do not operate in an inlet area of the impeller where the leading edges of the primary vanes are operating but act to increase the number of impulses per revolution of the impeller; and a pair of inducers positioned one within each of said shrouds adjacent the leading edges of said primary vanes and each having a plurality of spiral blades, with each blade having a leading edge with a lead angle of around 7½° and a pitch to accelerate fluid flow to said primary vanes.

9. An impeller assembly for a double suction, double volute centrifugal pump, comprising:

a central hub;

a plurality of primary vanes integrally formed on both sides of said central hub and spirally extending outwardly of the hub with increasing space therebetween and with an angular extent of more than 180° about the axis of the impeller and with the primary vanes on one side of the central hub being staggered relative to the primary vanes on the other side;

a pair of shrouds fixed to said vanes, one at each side of said central hub;

the lead angle at the leading edge of each of said primary vanes being less than 13° and increasing from the shroud to said central hub;

a plurality of curved partial vanes positioned one between a pair of primary vanes, each of said partial vanes having a leading edge positioned angularly a substantial distance behind the leading edge of the preceding primary vane and at a radial distance from the impeller axis which is approximately midway between the leading edges of the primary vanes and the periphery of the impeller whereby said partial vanes do not operate in an inlet area of the impeller where the leading edges of the primary vanes are operating, and said partial vanes having a trailing edge at the periphery of the impeller approximately midway between the trailing edges of the adjacent primary vanes to increase the number of impulses per revolution of the impeller;

and a pair of inducers positioned one within each of said shrouds adjacent the leading edges of said primary vanes and each having a plurality of spiral blades, with each blade having a leading edge with a lead angle of a few degrees and a pitch to accelerate fluid flow to said primary vanes.

* * * * *

Disclaimer 3,953,150.—*Hasan F. Onal*, Denver, Colo. IMPELLER APPARATUS. Patent dated Apr. 27, 1976. Disclaimer filed Apr. 4, 1977, by the assignee, *Sundstrand Corporation*.

Hereby enters this disclaimer to claims 2, 3 and 4 of said patent.

[*Official Gazette September 30, 1980.*]